United States Patent
Chen et al.

(10) Patent No.: US 12,113,951 B2
(45) Date of Patent: Oct. 8, 2024

(54) HIGH-RESOLUTION PSEUDO-RANDOM DOTS PROJECTOR MODULE FOR DEPTH SENSING

(71) Applicant: Google LLC, Mountain View, CA (US)

(72) Inventors: Xi Chen, Mountain View, CA (US); Andrew Huibers, Los Altos, CA (US)

(73) Assignee: Google LLC, Mountain View, CA (US)

( * ) Notice: Subject to any disclaimer, the term of this patent is extended or adjusted under 35 U.S.C. 154(b) by 445 days.

(21) Appl. No.: 17/450,351

(22) Filed: Oct. 8, 2021

(65) Prior Publication Data
US 2023/0112542 A1   Apr. 13, 2023

(51) Int. Cl.
  *H04N 13/254*  (2018.01)
  *G01B 11/25*  (2006.01)
  *G06T 7/521*  (2017.01)
  *H04N 13/207*  (2018.01)

(52) U.S. Cl.
  CPC ....... *H04N 13/254* (2018.05); *G01B 11/2513* (2013.01); *G01B 11/254* (2013.01); *G06T 7/521* (2017.01); *H04N 13/207* (2018.05)

(58) Field of Classification Search
  CPC .............. G02B 30/40; G02B 2027/0178; G02B 27/30; H04N 13/254; H04N 13/207; G06T 7/521; G01B 11/2513; G01B 11/254
  See application file for complete search history.

(56) References Cited

U.S. PATENT DOCUMENTS

| 9,826,216 B1 | 11/2017 | Hazeghi et al. |
| 2002/0041717 A1* | 4/2002 | Murata ............... G06T 5/80 |
| | | 382/284 |
| 2005/0117215 A1* | 6/2005 | Lange ............... G06T 15/04 |
| | | 348/42 |

(Continued)

FOREIGN PATENT DOCUMENTS

| CN | 101895693 A | * 11/2010 | |
| CN | 106061376 A | * 10/2016 | ........... A61B 5/0037 |

(Continued)

OTHER PUBLICATIONS

Wei et al. ("Spatiotemporal Correlation-Based Accurate 3D Face Imaging Using Speckle Projection and Real-Time Improvement"). (Year: 2021).*

(Continued)

*Primary Examiner* — Dung Hong
(74) *Attorney, Agent, or Firm* — Brake Hughes Bellermann LLP

(57) ABSTRACT

A system for projecting dots onto a three-dimensional image is configured to activate multiple pseudo-random dot projectors sequentially. Each pseudo-random dot projector includes an illumination source and a wavefront modulating element (WME) located along an optical axis in a path traversed by radiation produced by the illumination source. The system is configured to form images of dots in the projection plane along the optical axis. The system may also include controlling circuitry configured to perform a sequen- (Continued)

tial projection operation on the plurality of pseudo-random dot projection systems to produce a temporal sequence of images and aggregate and process the temporal sequence of images to produce a high-resolution depth image of the three-dimensional surface.

20 Claims, 10 Drawing Sheets

(56) References Cited

U.S. PATENT DOCUMENTS

| | | | | |
|---|---|---|---|---|
| 2005/0264858 A1* | 12/2005 | Vesely | ............... | H04N 13/279 |
| | | | | 359/13 |
| 2012/0182403 A1* | 7/2012 | Lange | ............... | H04N 13/128 |
| | | | | 348/51 |
| 2013/0038881 A1 | 2/2013 | Pesach et al. | | |
| 2014/0320605 A1* | 10/2014 | Johnson | ............ | G01B 11/2536 |
| | | | | 348/47 |
| 2017/0150124 A1 | 5/2017 | Thuries | | |
| 2018/0124372 A1* | 5/2018 | Yang | ................ | H04N 13/239 |
| 2020/0082496 A1 | 3/2020 | Chong et al. | | |

FOREIGN PATENT DOCUMENTS

| | | | | |
|---|---|---|---|---|
| JP | 2007101930 A | * | 4/2007 | ............. G03B 21/10 |
| WO | WO-2005034527 A1 | * | 4/2005 | ............. G02B 27/22 |
| WO | 2014172508 A1 | | 10/2014 | |

OTHER PUBLICATIONS

International Search Report and Written Opinion for PCT Application No. PCT/US2022/072561, mailed on Sep. 23, 2022, 13 pages.

Xiong, et al., "Spatiotemporal Correlation-Based Accurate 3D Face Imaging Using Speckle Projection and Real-Time Improvement", Applied Sciences, 11, 8588, https://doi.org/10.3390/app11188588, Sep. 16, 2021, 18 pages.

Zhou, et al., "3-D Face Registration Solution With Speckle Encoding Based Spatial-Temporal Logical Correlation Algorithm", Optics Express, vol. 27, No. 15, https://doi.org/10.1364/OE.27.021004, Jul. 22, 2019, pp. 21004-21019.

"3D Sensing With Structured Light Using Random Dot Pattern Generators", IL Photonics BSD Ltd., Jul. 9, 2020, 6 pages.

Grunnet-Jepsen, et al., "Projectors for D400 Series Depth Cameras", Revision 1.0, https://dev.intelrealsense.com/docs/projectors, Jun. 28, 2021, 22 pages.

* cited by examiner

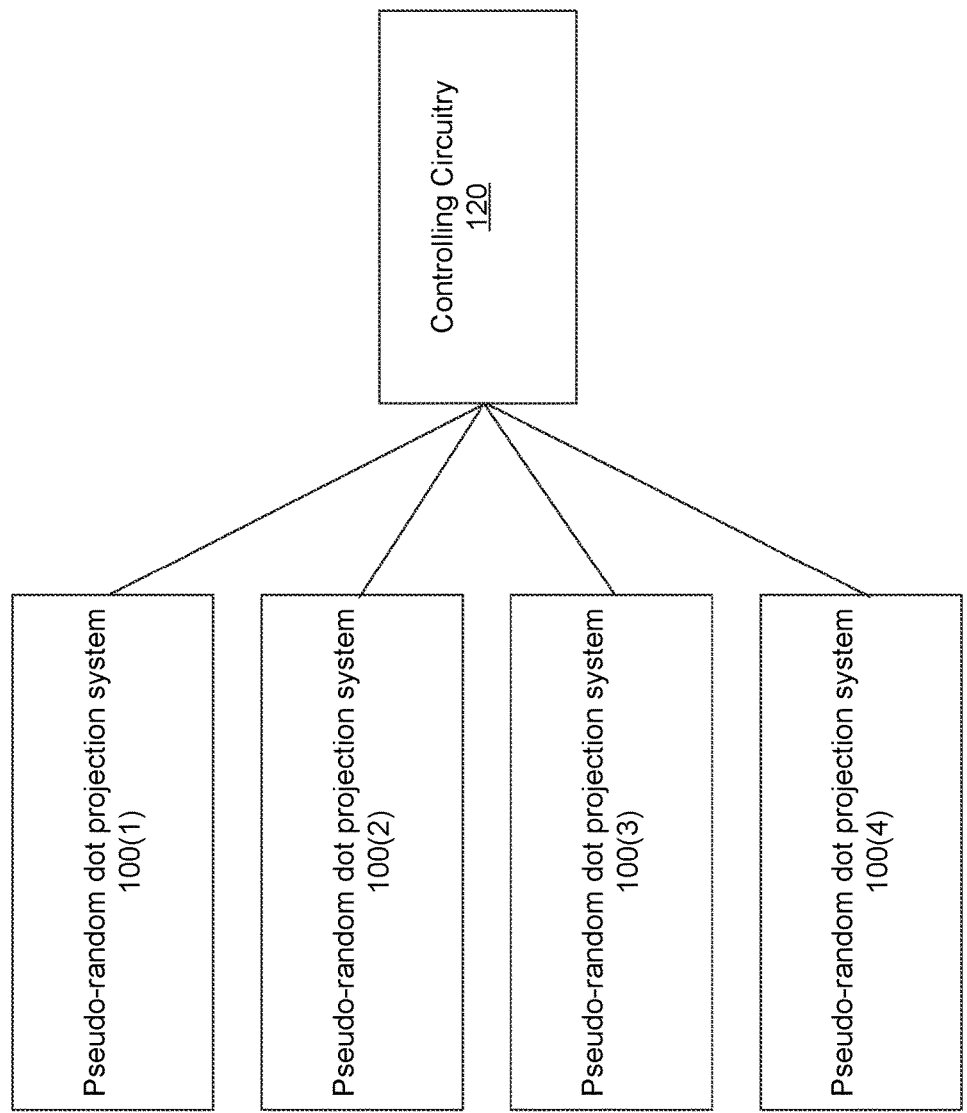

104

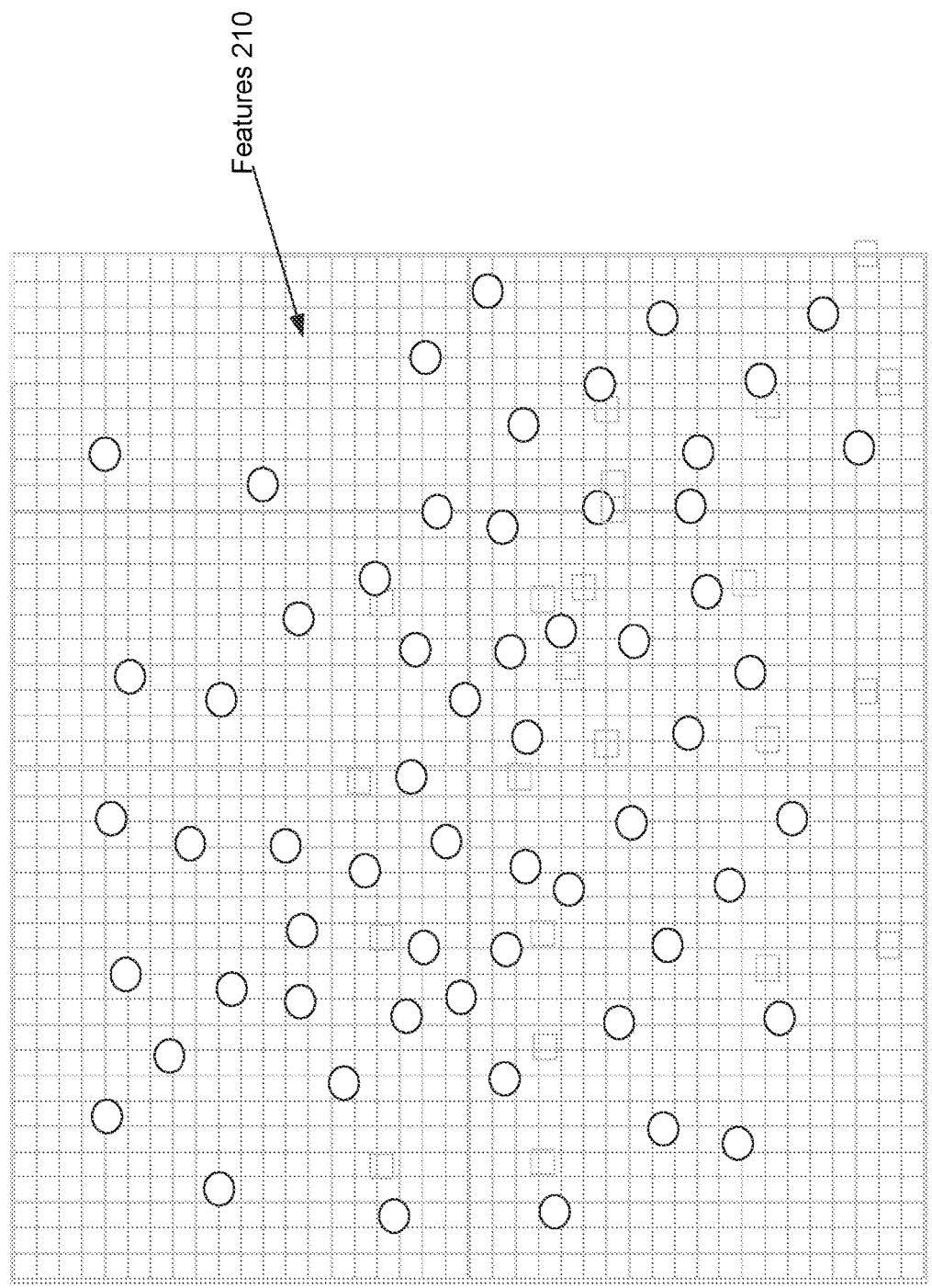

500

Perform a projection operation on each of a plurality of pseudo-random dot projection systems according to a specified schedule, the projection operation including forming an image of a respective plurality of dots on a three-dimensional surface in a vicinity of a respective projection plane to produce a temporal sequence of images, the respective plurality of dots formed by features included in a wavefront modulating element (WME), the WME being located along an optical axis in a path traversed by radiation produced by an illumination source, the projection plane being located a distance from the WME along the optical axis     502

Aggregate the temporal sequence of images to produce a high-resolution depth image of the three-dimensional surface

HIGH-RESOLUTION PSEUDO-RANDOM DOTS PROJECTOR MODULE FOR DEPTH SENSING

TECHNICAL FIELD

This description relates to forming high-resolution, three-dimensional depth images.

BACKGROUND

Some three-dimensional imaging systems, such as those used in three-dimensional video conferencing, use high-resolution depth maps, along with texture information, to form three-dimensional images of people and objects in real time during a conference.

SUMMARY

Implementations disclosed herein provide an improved technique for forming high resolution, three-dimensional images by projecting pseudo-random dots onto a surface defining a three-dimensional image. Features configured to form pseudo-random dots in a vicinity of a projection plane are embedded in a wavefront modulating element (WME) such as a diffractive optical element (DOE). The dots are useful in solving left/right (L/R) correspondence problems in comparing three-dimensional images from different perspectives. Because of limitations to the density of dots, the ability to perform an accurate L/R correspondence is limited. High resolution is achieved in the absence of texture on the surface by using multiple projectors of the dots by sequentially activating multiple projectors. N sequential projections provide a reduction in duty cycle by a factor of N.

In one general aspect, a method can include performing a projection operation on each of a plurality of pseudo-random dot projection systems according to a specified schedule, the projection operation including forming an image of a respective plurality of dots on a three-dimensional surface in a vicinity of a respective projection plane to produce a temporal sequence of images, the respective plurality of dots formed by features included in a wavefront modulating element (WME), the WME being located along an optical axis in a path traversed by radiation produced by an illumination source, the projection plane being located a distance from the WME along the optical axis. The method can also include aggregating the temporal sequence of images to produce a high-resolution depth image of the three-dimensional surface.

In another general aspect, a computer program product comprises a non-transitory storage medium, the computer program product including code that, when executed by processing circuitry of a computing device, causes the processing circuitry to perform a method. The method can include performing a projection operation on each of a plurality of pseudo-random dot projection systems according to a specified schedule, the projection operation including forming an image of a respective plurality of dots on a three-dimensional surface in a vicinity of a respective projection plane to produce a temporal sequence of images, the respective plurality of dots formed by features included in a wavefront modulating element (WME), the WME being located along an optical axis in a path traversed by radiation produced by an illumination source, the projection plane being located a distance from the WME along the optical axis. The method can also include aggregating the temporal sequence of images to produce a high-resolution depth image of the three-dimensional surface.

In another general aspect, an apparatus comprises a plurality of pseudo-random dot projection systems, each of the plurality of pseudo-random dot projection systems including, respectively, a wavefront modulating element (WME) located along an optical axis in a path traversed by radiation produced by an illumination source, the WME features configured to form an image of a plurality of dots in a vicinity of a projection plane, the projection plane being located a distance from the WME along the optical axis; and a controlling device. The controlling device includes memory and controlling circuitry coupled to the memory. The controlling circuitry can be configured to perform a projection operation on each of the plurality of pseudo-random dot projection systems according to a specified schedule, the projection operation including forming an image of the respective plurality of dots on a three-dimensional in the vicinity of the projection plane to produce a temporal sequence of images. The controlling circuitry can also be configured to aggregate the temporal sequence of images to produce a high-resolution depth image of a three-dimensional surface.

The details of one or more implementations are set forth in the accompanying drawings and the description below. Other features will be apparent from the description and drawings, and from the claims.

BRIEF DESCRIPTION OF THE DRAWINGS

FIG. 1C is a diagram that illustrates an example plurality of pseudo-random dot projection systems used together to decrease duty cycle and increase resolution.

FIG. 2 is a diagram that illustrates an example wavefront modulating element (WME) that includes features configured to form images of pseudo-random dots placed with a random number generator.

FIG. 5 is a flow chart that illustrates an example method of performing the improved technique within the electronic environment.

DETAILED DESCRIPTION

Some parts of images may have no texture. In that case, there may be problems comparing points on the image surface for, e.g., correspondence. A conventional approach to address such correspondence problems is to introduce dots in the imaging systems. For example, when features configured to produce dots are arranged on a wavefront modulating element such as a diffractive optical element, a projection system may form images of dots onto a surface of a three-dimensional scene. This allows a registration of untextured portions of the three-dimensional scene surfaces and subsequent correspondence analyses.

A technical problem with the above-described conventional approaches may not achieve a desired resolution for some video conferencing applications. For example, a conventional projection system can achieve a dot density of just over 4 dots/degree on a 1080 by 864 pixel mask, i.e., a 2.8% duty cycle. Such resolution may not be sufficient in many scenarios for solving, e.g., a L/R correspondence problem.

In accordance with the implementations described herein, a technical solution to the above-described technical problem includes a system configured to activate multiple pseudo-random dot projectors sequentially. Each pseudo-random dot projector includes an illumination source, a wavefront modulating element (WME) located along an optical axis in a path traversed by radiation produced by the illumination source, and detectors (e.g., cameras) of optical radiation at various points of view in a vicinity of a projection plane. The system may also include controlling circuitry configured to perform a sequential projection operation on the plurality of pseudo-random dot projection systems to produce a temporal sequence of images, and aggregate and process the temporal sequence of images to produce a high-resolution depth image of a three-dimensional surface.

A technical advantage of disclosed implementations is that such implementations increase the dot density by a factor of N when there are N projectors. Thus, a desired resolution may be achievable by using multiple projectors. Such an increased resolution is useful in solving L/R correspondence problems in three-dimensional images.

Figure 1A:
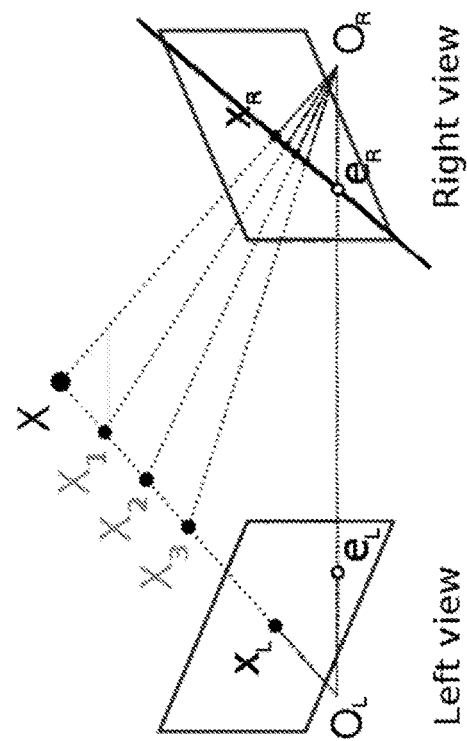
FIG. 1A is a diagram that illustrates an example scenario in which a three-dimensional scene is sampled from different perspectives.

FIG. 1A is a diagram that illustrates an example scenario 100 in which a three-dimensional scene is sampled from different perspectives. In FIG. 1A, the scenario 100 represents a L/R correspondence problem in stereoscopic imaging. As shown in FIG. 1A, there is a left view $O_L$ and a right view $O_R$. FIG. 1A illustrates a process involving raytraces to solve L/R correspondences and determine, for example, a location of the point X in either view. In many cases in which there is no texture provided for images, one may project images of dots to make the comparisons to solve the L/R correspondence problem.

Figure 1B:
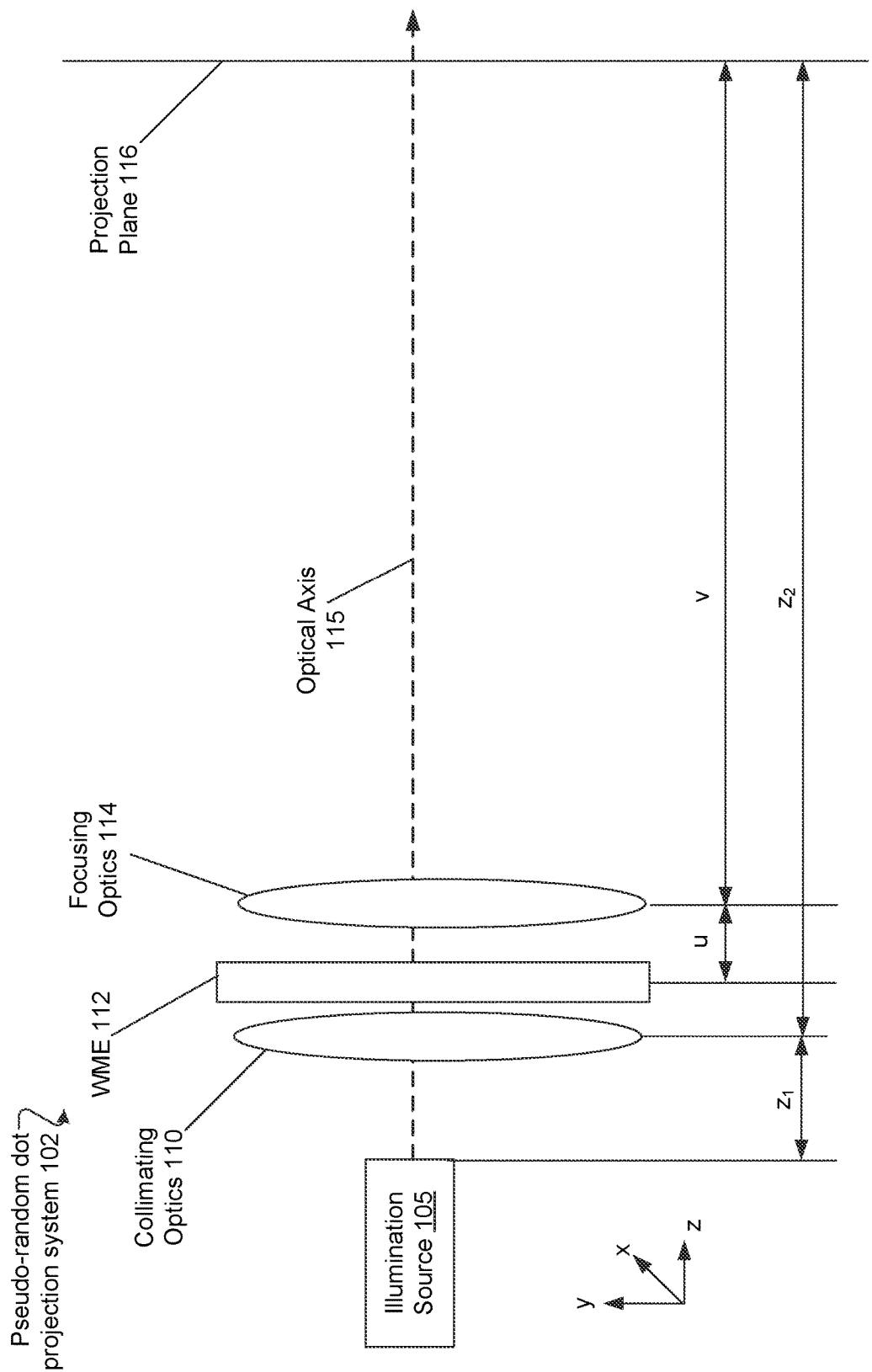
FIG. 1B is a diagram that illustrates an example pseudo-random dot projection system for projecting random dots using a WME in a vicinity of a projection plane.

FIG. 1B is a diagram that illustrates an example pseudo-random dot projection system 102 for projecting random dots using a WME onto detectors in a vicinity of a projection plane. As shown in FIG. 1B, the pseudo-random dot projection system 102 includes an illumination source 102, a collimating optical system 110, a wavefront modulating element (WME) 112, a focusing optical system 114, configured to form an image in a projection plane 116.

The illumination source 102 is configured to produce electromagnetic radiation via which dots are projected onto the projection plane 116. In some implementations, the illumination source 102 is a laser. In some implementations, the illumination source 102 emits the electromagnetic radiation in the near-infrared (NIR) range of the electromagnetic spectrum. In some implementations, the mean wavelength of the emitted electromagnetic radiation is between 800 nm and 1000 nm; for example, the mean wavelength of the emitted electromagnetic radiation is about 854 nm. In some implementations, the laser is an edge-emitting laser diode.

In some implementations, the radiation emitted from the illumination source 102 has a gaussian beam profile with a waist (i.e., minimum width) that varies with distance from the illumination source 102 along an optical axis. 115. In some implementations, the gaussian beam profile has different widths according to whether the width is measured parallel to the x-axis or y-axis, as shown in FIG. 1B. In some implementations, the gaussian beam profile includes largely a single propagation mode, e.g., $TEM_{00}$. In some implementations, the profile has a full-width, half-maximum divergence angle between 5 and 20 degrees. In some implementations, the divergence angle of the beam as measured parallel to the x-axis is about 8 degrees. In some implementations, the divergence angle of the beam as measured parallel to the y-axis is about 17 degrees.

The collimating optical system 110 is configured to collimate radiation emitted from the illumination source 105. In some implementations, the collimating optical system 110 includes an aspheric lens to produce collimated radiation. In some implementations, the collimating optical system 110 also includes a cylindrical lens. In some implementations, the collimating optical system 110 is also configured to produce a specified beam size on the WME 112 when the emitted radiation from the illumination source 102 is in the form of a beam, e.g., a gaussian beam. In some implementations, the specified beam size is between 1 mm and 10 mm. In some implementations, the specified beam size is about 3 mm. In some implementations, the collimating optical system 110 is configured to cause the gaussian beam to have a local minimum waist size at the WME 112.

The WME 112 is configured to present pseudo-random dots in the path of the electromagnetic radiation generated by the illumination source 105. When the collimating optical system 110 collimates the radiation sufficiently well, all or most of the radiation is normally incident on the WME 112. Nevertheless, in some implementations, a design of the pseudo-random dots in the WME 112 may take a spread of angles of incidence of the radiation into account; a preferred arrangement assumes normal incidence of the radiation.

In some implementations, the WME 112 includes a diffractive optical element (DOE). In some implementations, the DOE includes features configured to form pseudo-random dots placed using a random number generator. In some implementations, where the WME 112 is in a Fourier transform plane with respect to the projection plane 116, the representation includes features defined by a Fourier transform, or an inverse Fourier transform, of the pseudo-random dots; the focusing optical system 114 uses the collimated radiation to form the pseudo-random dots on a three-dimensional surface in the vicinity of the projection plane 116; the projection plane 116 is assumed to be far enough from the WME 112 to be in the far field, where the Fourier transform properties of the focusing optical system 114 are valid. In some implementations, the features are formed using an image transfer process such as lithography. In some implementations, the manufacturing of the DOE is based on a pixel size between 1 μm and 2 μm. In some implementations, the pixel size is about 1.14 μm, based on a diagonal field of view (DFoV) specification of about 54.7 degrees, which is in turn based on a target size of WME 112 of 1131 mm by 905 mm at a distance along the optical axis of 1.4 m from the illumination source 105.

The focusing optical system 114 is configured to image the dots in the WME 112 in the projection plane 116. In some implementations, the focusing optical system 114 includes a flat lens with a thickness between 1 mm and 10 mm. In some implementations, the focusing optical system 114 is configured to produce a spot size in the projection plane 116 significantly less than an extent of a single pixel, e.g., about 1.14 mm, on the WME 112. In some implementations, the focusing optical system 114 is configured to produce a spot size in the projection plane 116 of about 0.748 mm at a distance of 1.4 m from the illumination source 105. In some implementations, the focusing optical system 114 is configured to arrange the gaussian beam emitted from the illumination source 105 such that a local minimum of the beam waist occurs at the projection plane 116.

In some implementations, the images of the dots in the vicinity of the projection plane 116 are captured using cameras at various points of view. The cameras need not be in the projection plane 116 but in positions configured to capture the images at specified angles.

As shown in FIG. 1B, the collimating optical system 110 is at a distance $z_1$ from the illumination source 105 and a distance $z_2$ from the projection plane 116. In some implementations, the distances $z_1$ and $z_2$ are defined such that the illumination source 105, collimating optical system 110, and projection plane 116 form a gaussian imaging relationship, i.e., $$\frac{1}{z_1} + \frac{1}{z_2} = \frac{1}{f},$$

where f is the focal length of the collimating optical system 110.

The arrangement of the WME 112, focusing optical system 114, and projection plane 116 may determine the width of an image of a dot in the projection plane 116. For example, if u is a distance between the WME 112 and the focusing optical system 114, v is a distance between a principal plane of the focusing optical system 114 and projection plane 116, and $\omega_1$ is a beam waist at a principal plane of the collimating optical system 110, then the beam waist $\omega_2$ in the projection plane 116 is given by $$\omega_2 = \omega_1 \sqrt{\left(1 - \frac{v}{F}\right)^2 + \frac{\left(u + v\left(1 - \frac{u}{F}\right)\right)^2}{q^2}},$$

where $q = \pi \omega_1^2 / \lambda$, $\lambda$ is a mean wavelength of the radiation emitted by the illumination source 105, and the focal length of the focusing optical system 116 F is given by $$F = \frac{q^2 + u^2 + 2uv - \sqrt{(q^2 + u^2 + 2uv)^2 - 4v(u+v)(q^2 + u^2)}}{2(u + v)}.$$

FIG. 1C is a diagram that illustrates an example scenario 103 in which a plurality of pseudo-random dot projection systems 100(1 . . . 4) are used together to decrease duty cycle and increase resolution of dots on an image surface. As shown in FIG. 1C, controlling circuitry 120 controls the operation of each plurality of pseudo-random dot projection systems 100(1 . . . 4), although in some implementations any number of projectors may be used. In some implementations, controlling circuitry 120 operates each of the plurality of pseudo-random dot projection systems 100(1 . . . 4) according to a specified schedule. For example, the schedule indicates times at which the respective illumination sources of each pseudo-random dot projection system 100(1 . . . 4) emits radiation and times at which the respective illumination sources of each pseudo-random dot projection system 100(1 . . . 4) does not emit radiation. An example of such a schedule is described with regard to FIG. 1D.

Figure 1D:
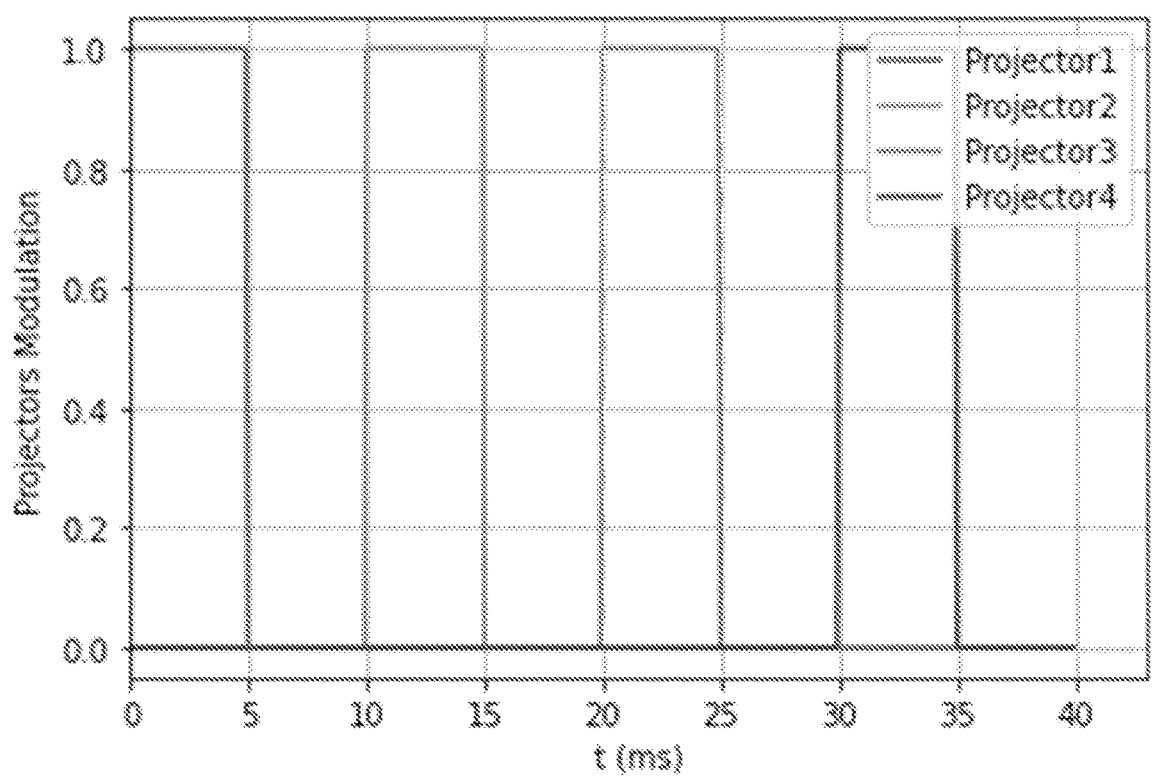
FIG. 1D is a plot that illustrates an example modulation pattern for activating the plurality of pseudo-random dot projection systems shown in FIG. 1C.

FIG. 1D is a plot that illustrates an example schedule 104 for determining times at which the respective illumination sources of each of the plurality of pseudo-random dot projection systems emits or does not emit radiation according to the controlling circuitry 120 shown in FIG. 1C. The schedule 104 indicates that each projector is activated (i.e., the respective illumination sources emit radiation) one at a time for a period of 5 ms, and that another 5 ms passes before another projector is activated after that projector is deactivated. Because the time intervals are sufficiently small, all of the dots from all of the projectors are resolved on the three-dimensional imaging surface at once. In some implementations, the illumination uses visible light and the human eye may resolve such dots.

Figure 1E:
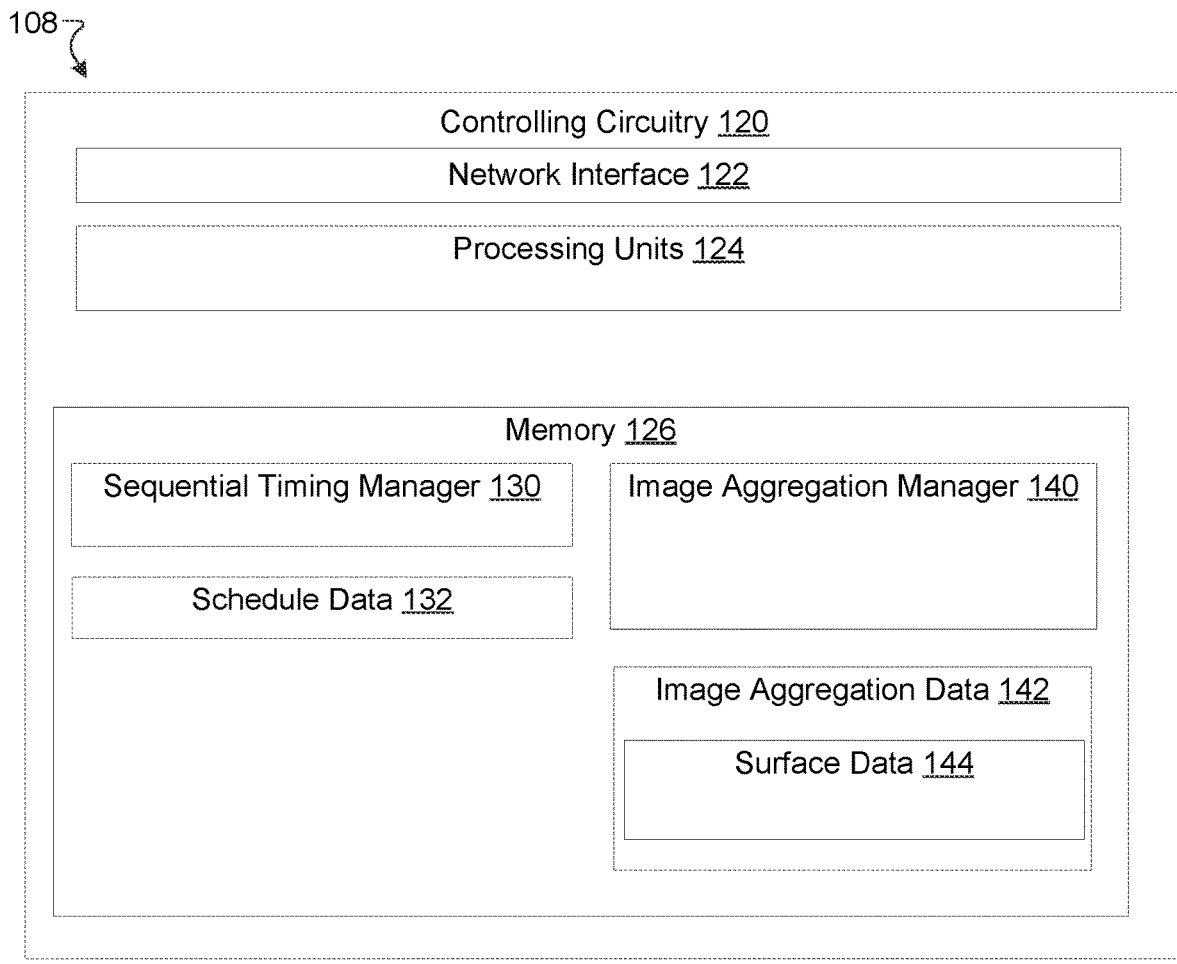
FIG. 1E is a diagram that illustrates example controlling circuitry in which improved techniques described herein may be implemented.

FIG. 1E is a diagram that illustrates an example electronic environment 108 including the controlling circuitry 120 (FIG. 1C) in which the above-described technical solution may be implemented. The controlling circuitry 120 is configured to activate multiple pseudo-random dot projectors, e.g., pseudo-random dot projection systems 100(1 . . . 4), sequentially.

The controlling circuitry 120 includes a network interface 122, one or more processing units 124, and memory 126. The network interface 122 includes, for example, Ethernet adaptors and the like, for converting electronic and/or optical signals received from a network to electronic form for use by the controlling circuitry 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, one or more of the components of the computer 120 can be, or can include processors (e.g., processing units 124) configured to process instructions stored in the memory 126. Examples of such instructions as depicted in FIG. 1 include a sequential timing manager 130 and an image aggregation manager 140. Further, as illustrated in FIG. 1, the memory 126 is configured to store various data, which is described with respect to the respective managers that use such data.

The sequential timing manager 130 is configured to activate each of the illumination sources of a plurality of pseudo-random dot projection systems according to schedule data 132 (e.g., that in FIG. 1D). In some implementations, the sequential timing manager 130 is configured to activate the pseudo-random dot projection systems over a network connection via the network interface 122. In some implementations, the sequential timing manager 130 is configured to activate the pseudo-random dot projection systems over serial or bus connections to a device including the controlling circuitry 120.

The schedule data 132 represents a schedule for determining times at which the respective illumination sources of each of the plurality of pseudo-random dot projection systems emits or does not emit radiation. In some implementations, the schedule data 132 takes the form of a first column of values representing an amplitude, a second column of values identifying a projector (e.g., a projector identifier), and a third column of values representing a time in, e.g., milliseconds. In some implementations, the amplitude is a binary value (e.g., zero or one) or a Boolean value (e.g., "ON" or "OFF").

The image aggregation manager 140 is configured to identify locations of images of dots on the three-dimensional surface for the purposes of solving a L/R correspondence problem. The image aggregation data 142 represents locations of the images of the dots on the three-dimensional surface, which is represented by surface data 144.

The components (e.g., modules, processing units 124) of the controlling circuitry 120 can be configured to operate based on one or more platforms (e.g., one or more similar or different platforms) that can include one or more types of hardware, software, firmware, operating systems, runtime libraries, and/or so forth. In some implementations, the components of the controlling circuitry 120 can be configured to operate within a cluster of devices (e.g., a server farm). In such an implementation, the functionality and processing of the components of the computer 120 can be distributed to several devices of the cluster of devices.

The components of the controlling circuitry 120 can be, or can include, any type of hardware and/or software configured to process attributes. In some implementations, one or more portions of the components shown in the components of the controlling circuitry 120 in FIG. 1E can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the controlling circuitry 120 can be, or can include, a software module configured for execution by at least one processor (not shown). In some implementations, the functionality of the components can be included in different modules and/or different components than those shown in FIG. 1E, including combining functionality illustrated as two components into a single component.

Although not shown, in some implementations, the components of the controlling circuitry 120 (or portions thereof) can be configured to operate within, for example, a data center (e.g., a cloud computing environment), a computer system, one or more server/host devices, and/or so forth. In some implementations, the components of the controlling circuitry 120 (or portions thereof) can be configured to operate within a network. Thus, the components of the controlling circuitry 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the controlling circuitry 120 can be, or can include, processors configured to process instructions stored in a memory. For example, a sequential timing manager 130 (and/or a portion thereof) and an image aggregation manager 140 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the controlling circuitry 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the controlling circuitry 120. As illustrated in FIG. 1E, the memory 126 is configured to store various data, including schedule data 132, image aggregation data 142 and surface data 144.

FIG. 2 is a diagram that illustrates an example wavefront modulating element (WME) 112 that includes features 210 representing pseudo-random dots placed with a random number generator. Each of the features 210 is designed so that its image in a projection plane is about 3 mm. In some implementations, the images of the dots in the projection plane are not circular but rather elliptical, owing to an astigmatism in the illumination source when the source is an edge-emitting laser diode. In some implementations, the image of the dots in a projection plane in which the illumination source has such astigmatism is about 3 mm in a fast (e.g., x) axis and about 0.7 mm in a slow (e.g., y) axis.

The WME 112 is designed such that there is a low spatial duty cycle for the dots (e.g., less than 3%, about 2.78%). When multiple projectors are used, the temporal duty cycle for each projector is lower, but the spatial duty cycle is better since more dots are projected. Accordingly, when imaged in concert with dots from other projection systems, the duty cycle decreases and the dot resolution increases without any interference or diffraction affecting the images.

In some implementations, the pattern of dots 210 shown in FIG. 2 may be reproduced in other projection systems but translated and rotated with respect to one another so that there is minimum overlay between the dots. In some implementations, the patterns of dots in each of the projection systems is generated individually using a random number generator and are different from one another.

Figure 3:
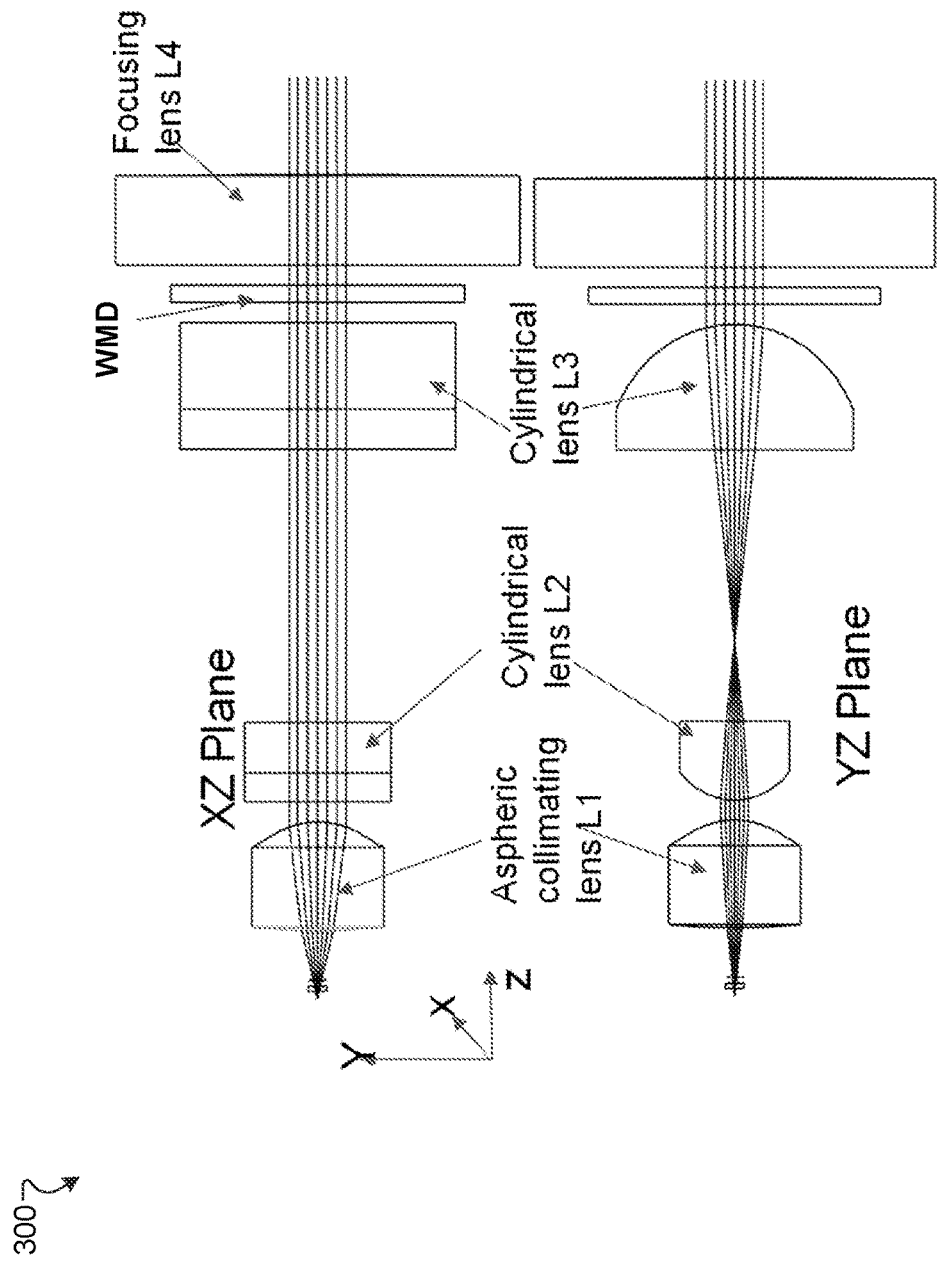
FIG. 3 is a raytrace diagram that illustrates an example beam behavior through optical elements in a pseudo-random dot projection system.

FIG. 3 is a ray trace diagram 300 that illustrates an example beam behavior through optical elements in a pseudo-random dot projection system. The diagram 300 includes depictions of illumination in two orthogonal planes: xy and yz.

In both planes, FIG. 3 shows the collimating lens as being made from three optical elements: aspheric lens L1 and cylindrical lenses L2 and L3. It is noted that, in the xz plane, the lens L2 is flat while in the yz plane, the lens L2 is curved. Accordingly, the lens L2 is cylindrical along the x-axis. Similarly, the lens L3 is also cylindrical along the x-axis. Accordingly, there is a minimum beam waist between the lenses L2 and L3 in the yz plane while the beam remains collimated in the xz plane. Collimation in both planes occurs after the last surface of the lens L3, before the light is incident on the WMD.

In some implementations, the aspheric lens L1 has a focal length between 3 mm and 10 mm. In some implementations, the aspheric lens L1 has a focal length of about 5.94 mm. In some implementations, the cylindrical lens L2 has a focal length between 3 mm and 10 mm in the yz plane. In some implementations, the cylindrical lens L2 has a focal length of about 6.4 mm. In some implementations, the cylindrical lens L3 has a focal length between 10 mm and 20 mm in the yz plane. In some implementations, the cylindrical lens L3 has a focal length of about 14 mm. In some implementations, the spacing between L1 and L2 is about 1.0 mm. In some implementations, the spacing between L2 and L3 is about 13.5 mm. In some implementations, the spacing between L3 and the WMD is about 1.0 mm. In some implementations, the spacing between the WMD and the focusing lens L4 is about 1.0 mm.

Figure 4:
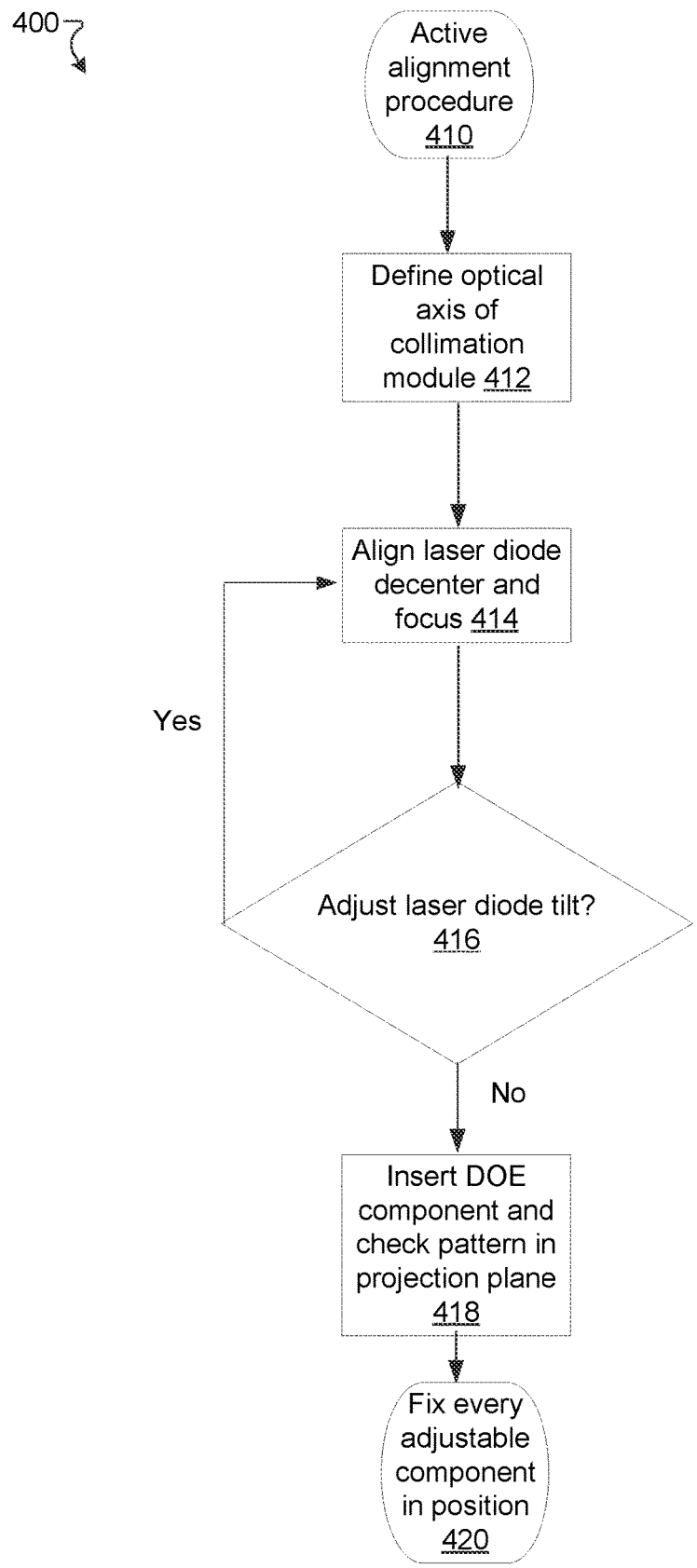
FIG. 4 is a flow chart that illustrates an example active alignment procedure for the optical elements in a pseudo-random dot projection system.

FIG. 4 is a flow chart 400 that illustrates an example active alignment procedure 410 for the optical elements in a pseudo-random dot projection system.

At 412, an optical axis of a collimation optical system of a pseudo-random dot projection system is defined. In some implementations, a helium-neon (HeNe) laser at 633 nm is used to define the optical axis. In some implementation, the axis is determined by verifying that laser beam spot locations at multiple (i.e., at least two) z locations along the optical axis are the same, with or without the collimation optical system.

At 414, the laser diode decenter and defocus are aligned. In some implementations, the laser diode centration is aligned with the optical axis of the collimation optical system by making the beam spot location the same as the original spot location from the HeNe laser, this time imaged using a near-infrared camera. In some implementations, the laser diode is then focused by minimizing the spot size, imaged by the near-infrared camera.

At 416, it is determined whether it is necessary to adjust a tilt of the laser diode. If it is necessary, then the tilt is adjusted and 414 is repeated. If not, then proceed.

At 418, the WMD is inserted into the projection system and the dot pattern is checked in the projection plane.

At 420. every adjustable component of the projection system is fixed in place.

FIG. 5 is a flow chart depicting an example method 500 of addressing a L/R correspondence problem using pseudo-random dots. The method 500 may be performed by software constructs described in connection with FIG. 1E, which reside in memory 126 of the controlling circuitry 120 and are run by the set of processing units 124 or may be performed by software constructs which reside in memory of the controlling circuitry 120.

At 502, the sequential timing manager 130 performs a sequential projection operation on the plurality of pseudo-random dot projection systems by, for each of the plurality of pseudo-random dot projection systems, forming an image of the respective plurality of dots on a three-dimensional surface in a vicinity of the respective projection plane to produce a temporal sequence of images.

At 504, the image aggregation manager 140 aggregates the temporal sequence of images to produce a high-resolution depth image of the three-dimensional surface.

Figure 6:
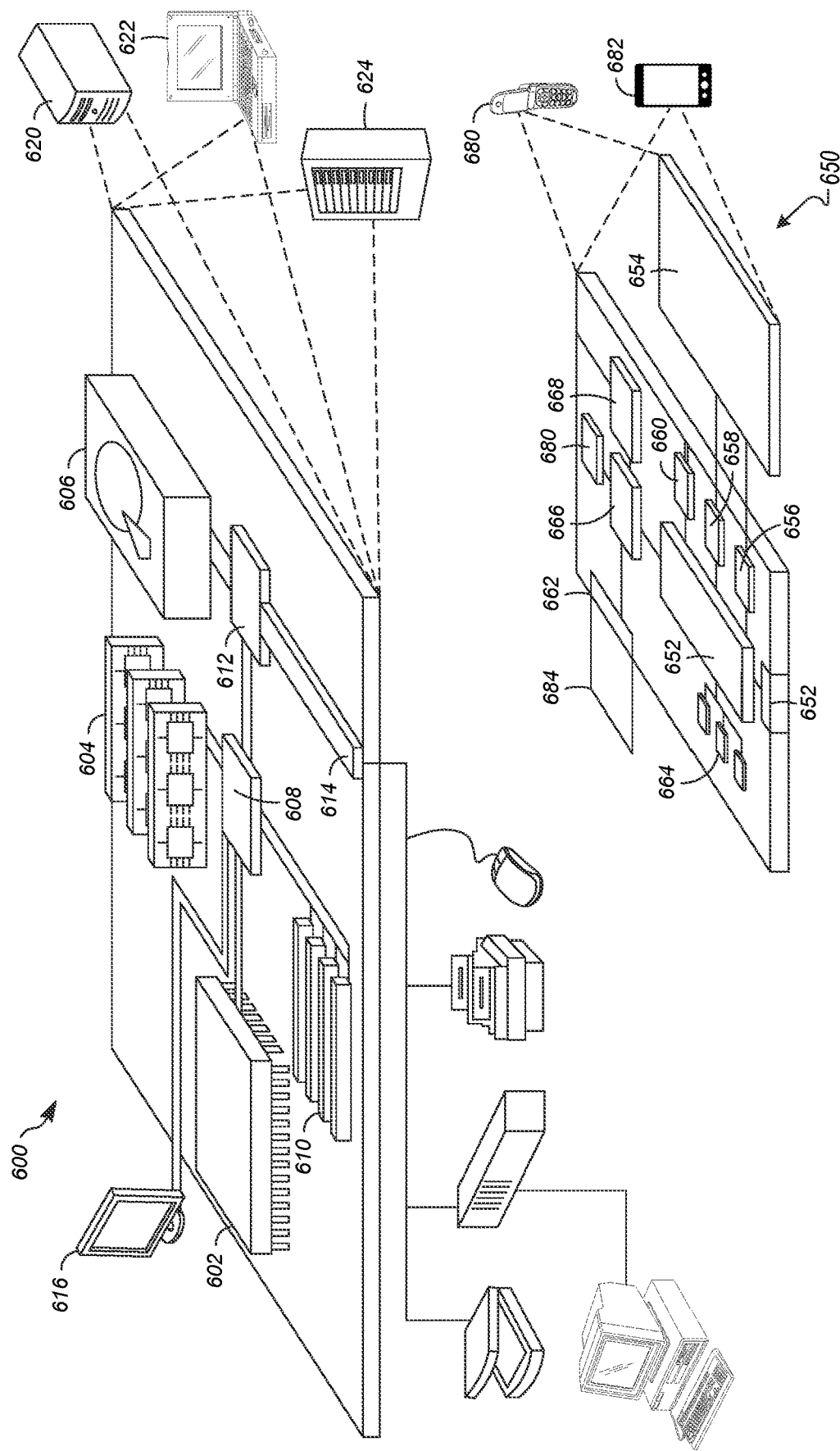
FIG. 6 is a diagram that illustrates an example of a computer device and a mobile computer device that can be used to implement the described techniques.

FIG. 6 illustrates an example of a generic computer device 600 and a generic mobile computer device 650, which may be used with the techniques described here. Computer device 600 is one example configuration of controlling circuitry 120 of FIG. 1E.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

In the following some examples are described.

Example 1. An apparatus, the apparatus comprising:
a plurality of pseudo-random dot projection systems, each of the plurality of pseudo-random dot projection systems including, respectively:
a wavefront modulating element (WME) located along an optical axis in a path traversed by radiation produced by an illumination source, the WME including features configured to form an image of a plurality of dots in a vicinity of a projection plane, the projection plane being located a distance from the WME along the optical axis; and
a controlling device, the controlling device including memory; and
controlling circuitry coupled to the memory, the controlling circuitry being configured to:
perform a projection operation on each of the plurality of pseudo-random dot projection systems according to a specified schedule, the projection operation including forming an image of the respective plurality of dots on a three-dimensional surface in the vicinity of a projection plane to produce a temporal sequence of images; and
aggregate the temporal sequence of images to produce a high-resolution depth image of the three-dimensional surface.

Example 2. The apparatus as in claim 1, wherein each of the plurality of pseudo-random dot projection systems further includes a respective focusing optical system located between the WME and the projection plane along the optical axis.

Example 3. The apparatus as in claim 2, wherein the focusing optical system is in optical contact with the WME.

Example 4. The apparatus as in claim 1, wherein the illumination source emits electromagnetic radiation with a mean wavelength between 800 nm and 1000 nm.

Example 5. The apparatus as in claim 1, wherein the illumination source includes an edge-emitting laser diode.

Example 6. The apparatus as in claim 1, wherein each of the plurality of pseudo-random dot projection systems further includes a respective collimating lens, the respective collimating lens being placed along the optical axis between the illumination source and the WME such that a location of the respective illumination source along the optical axis, the respective collimating lens, and the location of the respective projection plane along the optical axis satisfy a gaussian imaging relationship.

Example 7. The apparatus as in claim 1, wherein the image of the respective plurality of dots formed by each of the plurality of pseudo-random dot projection systems is based on a convolution of a transverse profile of a beam of electromagnetic radiation emitted by the illumination source and an impulse response of that pseudo-random dot projection system.

Example 8. The apparatus as in claim 7, wherein the transverse profile of the beam of electromagnetic radiation emitted by the illumination source is a gaussian beam having a specified width at the illumination source.

Example 9. The apparatus as in claim 8, wherein a local minimum of a width of the gaussian beam along the optical axis occurs at the WME.

Example 10. The apparatus as in claim 8, wherein a local minimum of a width of the gaussian beam along the optical axis occurs at the projection plane.

Example 11. The apparatus as in claim 1, wherein the plurality of dots formed by each WME has axial symmetry.

Example 12. The apparatus as in claim 1, wherein the pluralities of dots formed by the WMEs from each of the plurality of pseudo-random dot projection systems are uncorrelated.

Example 13. The apparatus as in claim 1, wherein the pluralities of dots formed by the WMEs from each of the plurality of pseudo-random dot projection systems are the same but translated and rotated with respect to one another.

Example 14. A method comprising:
performing a projection operation on each of a plurality of pseudo-random dot projection systems according to a specified schedule, the projection operation including forming an image of a respective plurality of dots on a three-dimensional surface in a vicinity of a respective projection plane to produce a temporal sequence of images, the respective plurality of dots being formed by features in a wavefront modulating element (WME), the WME being located along an optical axis in a path traversed by radiation produced by an illumination source, the projection plane being located a distance from the WME along the optical axis; and
aggregating the temporal sequence of images to produce a high-resolution depth image of the three-dimensional surface.

Example 15. The method as in claim 14, wherein each of the plurality of pseudo-random dot projection systems further includes a respective focusing optical system located between the WME and the projection plane along the optical axis.

Example 16. The method as in claim 14, wherein each of the plurality of pseudo-random dot projection systems further includes a respective collimating lens, the respective collimating lens being placed along the optical axis between the illumination source and the WME such that a location of the respective illumination source along the optical axis, the respective collimating lens, and the location of the respective projection plane along the optical axis satisfy a gaussian imaging relationship.

Example 17. The method as in claim 14, wherein the image of the respective plurality of dots formed by each of the plurality of pseudo-random dot projection systems is based on a convolution of a transverse profile of a beam of electromagnetic radiation emitted by the illumination source and an impulse response of that pseudo-random dot projection system.

Example 18. The method as in claim 17, wherein the transverse profile of the beam of electromagnetic radiation emitted by the illumination source is a gaussian beam having a specified width at the illumination source.

Example 19. The method as in claim 14, wherein the pluralities of dots formed by the WMEs from each of the plurality of pseudo-random dot projection systems are the same but translated and rotated with respect to one another.

Example 20. A computer program product comprising a nontransitive storage medium, the computer program product including code that, when executed by processing circuitry, causes the processing circuitry to perform a method, the method comprising:
performing a projection operation on each of a plurality of pseudo-random dot projection systems according to a specified schedule, the projection operation including forming an image of a respective plurality of dots on a three-dimensional surface in a vicinity of a respective projection plane to produce a temporal sequence of images, the respective plurality of dots being included in a wavefront modulating element (WME), the WME being located along an optical axis in a path traversed by radiation produced by an illumination source, the projection plane being located a distance from the WME along the optical axis; and
aggregating the temporal sequence of images to produce a high-resolution depth image of the three-dimensional surface.

What is claimed is:

1. An apparatus, the apparatus comprising:
a plurality of pseudo-random dot projection systems, each of the plurality of pseudo-random dot projection systems including:
a respective wavefront modulating element (WME) located along an optical axis in a path traversed by radiation produced by a respective illumination source, the respective WME including a diffractive optical element (DOE), the DOE including features configured to form an image of a respective plurality of dots in a vicinity of a respective projection plane, the respective projection plane being located a distance from the respective WME along the optical axis; and
a controlling device, the controlling device including memory; and
controlling circuitry coupled to the memory, the controlling circuitry being configured to:

perform a projection operation on each of the plurality of pseudo-random dot projection systems according to a specified schedule, the projection operation including, forming an image of the respective plurality of dots on a three-dimensional surface in the vicinity of the respective projection plane to produce a temporal sequence of images; and aggregate the temporal sequence of images to produce a high-resolution depth image of the three-dimensional surface.

2. The apparatus as in claim 1, wherein each of the plurality of pseudo-random dot projection systems further includes a respective focusing optical system located between the respective WME and the respective projection plane along the optical axis.

3. The apparatus as in claim 2, wherein the respective focusing optical system is in optical contact with the respective WME.

4. The apparatus as in claim 1, wherein the respective illumination source emits electromagnetic radiation with a mean wavelength between 800 nm and 1000 nm.

5. The apparatus as in claim 1, wherein the respective illumination source includes an edge-emitting laser diode.

6. The apparatus as in claim 1, wherein each of the plurality of pseudo-random dot projection systems further includes a respective collimating lens, the respective collimating lens being placed along the optical axis between the respective illumination source and the respective WME such that a location of the respective illumination source along the optical axis, the respective collimating lens, and the location of the respective projection plane along the optical axis satisfy a gaussian imaging relationship.

7. The apparatus as in claim 1, wherein the image of the respective plurality of dots formed by each of the plurality of pseudo-random dot projection systems is based on a convolution of a transverse profile of a beam of electromagnetic radiation emitted by the respective illumination source and an impulse response of that pseudo-random dot projection system.

8. The apparatus as in claim 7, wherein the transverse profile of the beam of electromagnetic radiation emitted by the respective illumination source is a gaussian beam having a specified width at the respective illumination source.

9. The apparatus as in claim 8, wherein a local minimum of a width of the gaussian beam along the optical axis occurs at the respective WME.

10. The apparatus as in claim 8, wherein a local minimum of a width of the gaussian beam along the optical axis occurs at the respective projection plane.

11. The apparatus as in claim 1, wherein the respective plurality of dots formed by the respective WME has axial symmetry.

12. The apparatus as in claim 1, wherein the pluralities of dots formed by the WMEs from each of the plurality of pseudo-random dot projection systems are uncorrelated.

13. The apparatus as in claim 1, wherein the pluralities of dots formed by the WMEs from each of the plurality of pseudo-random dot projection systems are the same but translated and rotated with respect to one another.

14. A method comprising:
performing a projection operation on each of a plurality of pseudo-random dot projection systems according to a specified schedule, the projection operation including forming an image of a respective plurality of dots on a three-dimensional surface in a vicinity of a respective projection plane to produce a temporal sequence of images, the respective plurality of dots formed by features included in a diffractive optical element (DOE) included in a respective wavefront modulating element (WME), the respective WME being located along an optical axis in a path traversed by radiation produced by a respective illumination source, the respective projection plane being located a distance from the respective WME along the optical axis; and aggregating the temporal sequence of images to produce a high-resolution depth image of the three-dimensional surface.

15. The method as in claim 14, wherein each of the plurality of pseudo-random dot projection systems further includes a respective focusing optical system located between the respective WME and the respective projection plane along the optical axis.

16. The method as in claim 14, wherein each of the plurality of pseudo-random dot projection systems further includes a respective collimating lens, the respective collimating lens being placed along the optical axis between the respective illumination source and the respective WME such that a location of the respective illumination source along the optical axis, the respective collimating lens, and the location of the respective projection plane along the optical axis satisfy a gaussian imaging relationship.

17. The method as in claim 14, wherein the image of the respective plurality of dots formed by each of the plurality of pseudo-random dot projection systems is based on a convolution of a transverse profile of a beam of electromagnetic radiation emitted by the respective illumination source and an impulse response of that pseudo-random dot projection system.

18. The method as in claim 17, wherein the transverse profile of the beam of electromagnetic radiation emitted by the respective illumination source is a gaussian beam having a specified width at the respective illumination source.

19. The method as in claim 14, wherein the pluralities of dots formed by the WMEs from each of the plurality of pseudo-random dot projection systems are the same but translated and rotated with respect to one another.

20. A computer program product comprising a non-transitory storage medium, the computer program product including code that, when executed by processing circuitry, causes the processing circuitry to perform a method, the method comprising:
performing a projection operation on each of a plurality of pseudo-random dot projection systems according to a specified schedule, the projection operation including forming an image of a respective plurality of dots on a three-dimensional surface in a vicinity of a respective projection plane to produce a temporal sequence of images, the respective plurality of dots formed by features included in a diffractive optical element (DOE) included in a respective wavefront modulating element (WME), the respective WME being located along an optical axis in a path traversed by radiation produced by a respective illumination source, the respective projection plane being located a distance from the respective WME along the optical axis; and aggregating the temporal sequence of images to produce a high-resolution depth image of the three-dimensional surface.

* * * * *